US006202978B1

(12) United States Patent
Vappula

(10) Patent No.: US 6,202,978 B1
(45) Date of Patent: Mar. 20, 2001

(54) REMOVABLE SIDE WALL SYSTEM FOR A CASTING MOULD

(75) Inventor: Kari Vappula, Toijala (FI)

(73) Assignee: Addtek Research and Development Oy AB, Nummela (FI)

( * ) Notice: Subject to any disclaimer, the term of this patent is extended or adjusted under 35 U.S.C. 154(b) by 0 days.

(21) Appl. No.: 09/274,328

(22) Filed: Mar. 23, 1999

(30) Foreign Application Priority Data

Mar. 27, 1998 (FI) .................................................. 980156 U

(51) Int. Cl.[7] ..................................................... B29C 33/16

(52) U.S. Cl. ........................... 249/187.1; 249/18; 249/26; 249/189; 249/190; 249/195; 52/DIG. 4

(58) Field of Search ............................... 249/18, 26, 189, 249/190, 195, 187.1; 52/DIG. 4

(56) References Cited

U.S. PATENT DOCUMENTS 3,730,657 * 5/1973 Malet et al. ............................. 425/3
5,273,251 * 12/1993 Badstieber ........................... 249/189
5,277,396 * 1/1994 Vappula ................................ 249/65

* cited by examiner

*Primary Examiner*—Carl D. Friedman
*Assistant Examiner*—Christy M. Syres
(74) *Attorney, Agent, or Firm*—Burns, Doane, Swecker & Mathis, LLP

(57) ABSTRACT

A side wall system for a concrete casting mould, including a side part (2, 3) which is removably attachable to a casting bed (1) by means of one or several magnets (7). The body (6) of the magnet part that carries the magnet (7) includes a pivoting shaft (10) about which the magnet part (6, 7) can be pivoted into a lower position wherein the magnet (7) is fastened to the casting bed (1) and into an upper position wherein the magnet is spaced from the casting bed. The side part (2, 3) includes a holder (5) on which the pivoting shaft (10) of the magnet part can be hung so that it can be pivoted between its lower and upper positions. The holder (5) has a mounting face to which the upper surface of the magnet (7) can be fastened by means of the magnetic force when the magnet is pivoted into its upper position about its pivoting shaft.

9 Claims, 2 Drawing Sheets

REMOVABLE SIDE WALL SYSTEM FOR A CASTING MOULD

TECHNICAL FIELD

This invention relates to a side wall system for a concrete casting mould including a side part which is removably attachable to a casting bed by means of one or several magnets.

BACKGROUND ART

Removable sides which are provided with different kinds of fastener arrangements for a casting mould for elements to be cast from concrete have been disclosed in the prior art. These sides can be placed in desired positions on the casting bed, depending on the size and on the shape of the piece to be cast.

Usually, when casting wall elements from concrete, a table mould, i.e. a tilt mould with side walls, is used as the horizontal mould. A casting machine moves above the table and applies a certain amount of mass into the mould. Once the concrete is hardened, the table is tilted about a tipping shaft provided on one side, almost into an upright position. That side wall of the mould that ends up in the upper position is removed and the element is lifted away from the table using loops provided on its sides. The position of the upper side wall has to be alterable according to the size of the element to be cast. Removable side walls can be used for this purpose.

Furthermore, removable and adjustable side parts enable door and window openings to be formed in desired places in the element.

Use of magnets for fastening of removable element sides is well known in the art. They are very suitable for the fastening of a side as they fasten to the smooth steel surface of the casting bed. In order to fasten the side tightly, strong magnets generating an adhering force of 15 kN, for example, have to be used. However, fastening of the magnets to the casting bed and removal of them therefrom after casting may be quite difficult in some systems.

DISCLOSURE OF INVENTION

The side wall system according to the invention is characterized in that

- the body of the magnet part that carries the magnet includes a pivoting shaft about which the magnet part can be pivoted into a lower position wherein the magnet is fastened to the casting bed, and into an upper position wherein the magnet is spaced from the casting bed,
- the side part includes a holder on which the pivoting shaft of the magnet part can be hung in such a way that it can be pivoted between its lower and upper positions, and
- the holder has a mounting face to which the upper surface of the magnet can be fastened by means of the magnetic force when the magnet is pivoted into its upper position about its pivoting shaft.

The invention provides a side wall arrangement assembly including a fastening system that is as generally applicable and easy to use as possible irrespective of what shape the side is or what kind of equipment automation is used. In the system according to the invention it is possible to use readily available side and magnet parts ex stock which are easy to combine in order to equip the system. In addition, the arrangement meets the requirements made of it as far ergonomics and automation are considered (light, smooth surfaces, easy to clean, robotics handling). The system is a suitable arrangement for side and opening moulds for all the present products of different thicknesses manufactured in the concrete industry.

The system according to the invention consists of three standard components, i.e. of a side wall, of a fastening magnet and of a release lever.

The entity formed by a side and a magnet according to the invention is light, compact and easy to use. It can be used in different ways, i.e. the magnet can be fixed to the side or it can be loose. The side can be fastened and removed easily and quickly. The system is simple and reliable.

BRIEF DESCRIPTION OF FIGURES

The invention and the details thereof will now be described in detail with reference to the accompanying figures wherein.

MODE FOR CARRYING OUT THE INVENTION

Figure 1:
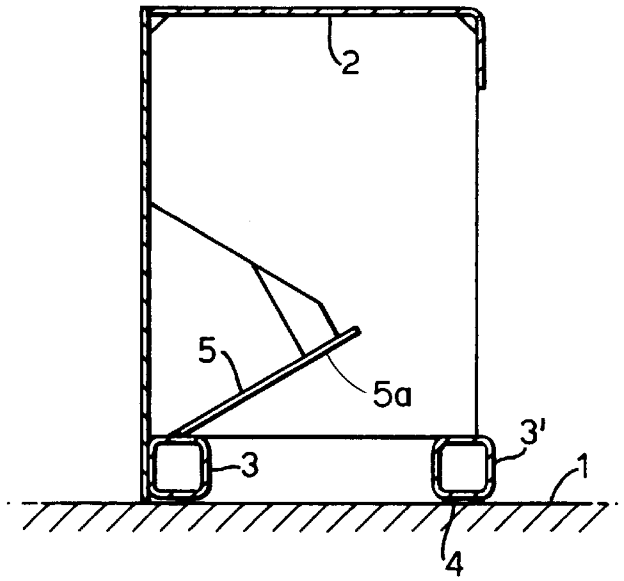
FIG. 1 is an end view of a side wall of a system according to the invention.

The removeable side part of the present invention includes two longitudinal pipes or bars 3, 3' and a side profile 2. The pipes 3, 3' are fastened, side by side, to the lower part of the side wall, inside the removable side profile 2 of the mould to be placed on the bed 1. This standard pipe construction serves as the base frame of the side wall. The side profile comprises a front and a top. The side wall has an open bottom, the lower part of the other side being open as well. The open rear part of the arrangement enables the magnet to be removed in the middle of the process. The side wall is preferably made of high-tenacity steel, but it is also possible to use extruded aluminum, light metal, plastic or other similar material. The structure results in light and strong arrangements and in an arrangement which as a whole is as narrow as possible. The shape of the side wall enables a robot to be used for the transfer of the side and for the storage.

Rubber pieces 4 holding the side wall in place are provided under the pipe 3' that lies further back, i.e. at a longer distance from the side wall. Magnet holders or racks 5 are fastened to the side wall with a spacing of about 1–15 meters. A holder has two plate-like, adjacent branches and a gap between them. The rack is attached in an inclined position on the pipe 3 that is the front pipe of the side wall, i.e. it lies nearer to the side profile 2.

Figure 2:
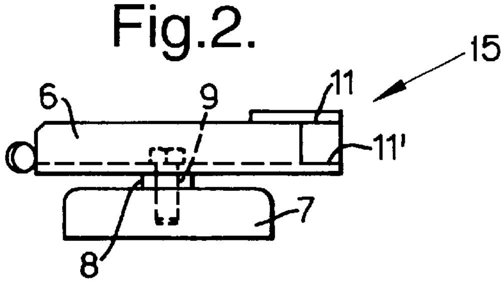
FIG. 2 is also an end view of a magnet part of the system according to the invention.

The fastening magnet (FIG. 2) is a separate magnet assembly that is easy to fasten and to remove from the side wall and to lock in place. Besides, its hold to the bed is easy to overcome. The magnet part 15 includes of a body 6 and of a permanent magnet 7. The magnet is fixed to the body by means of an adjustable screw 9 within a protecting bushing 8 that enables the magnet to be adjusted in height so that the side wall is securely fitting and tight in its entirety.

The magnet body 6 is of such a width that it can move in the gap between the two branches of the holder 5. One end of the body 6 is provided with a pivoting shaft 10 extending parallel to the side farther out to the sides of the body than the gap between the two branches of the holder 5. In the cross direction of the side wall the body 6 is longer than the distance between the pipes 3, 3' so that it can be laid crosswise on the pipes.

The other end of the body 6 is provided with an upper release surface 11 and lower release surfaces 11' on both sides thereof The release surfaces are located in such a way that the body 6 can pivot about its pivoting shaft 10 and move past the ends of the two branches of the holder when the magnet is supported on its holder 5.

Figure 3:
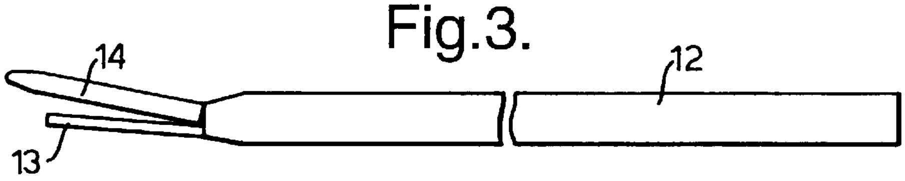
FIGS. 3 and 4 show a tool that is useful in the side system according to the invention, viewed from the side and from above, respectively.
Figure 4:
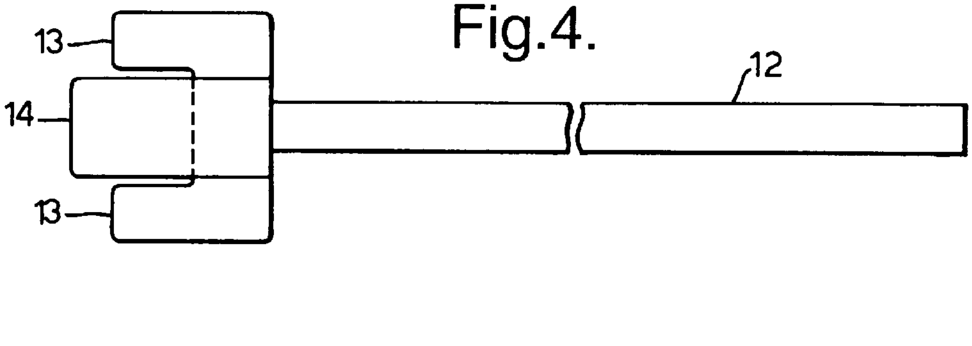
Figure 5:
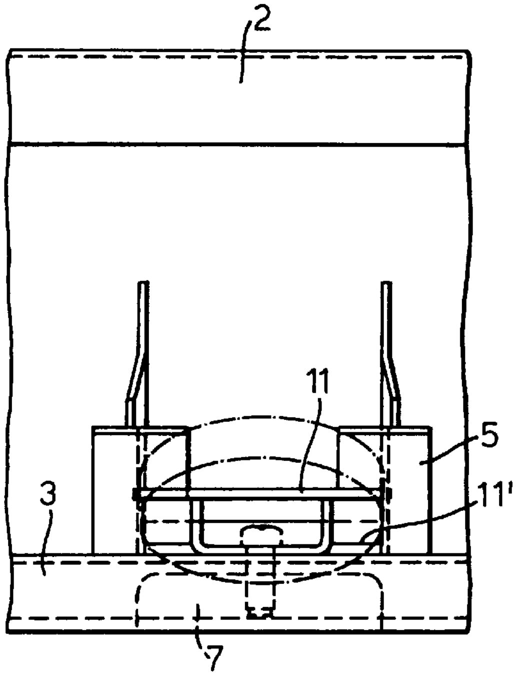
FIG. 5 shows the side wall and the magnet part viewed from the side of the side wall.

The release lever (FIGS. 3 and 4) is a light hand lever and easy to use. The lever comprises a bar 12 and two parallel shorter branches 13 at its end and a longer branch 14 between them. The shorter branches 13 are almost parallel to the bar 12 and rise only a little from the bar level while the direction of the longer branch 14 deviates slightly more from the direction of the bar and rises higher up.

Figure 6:
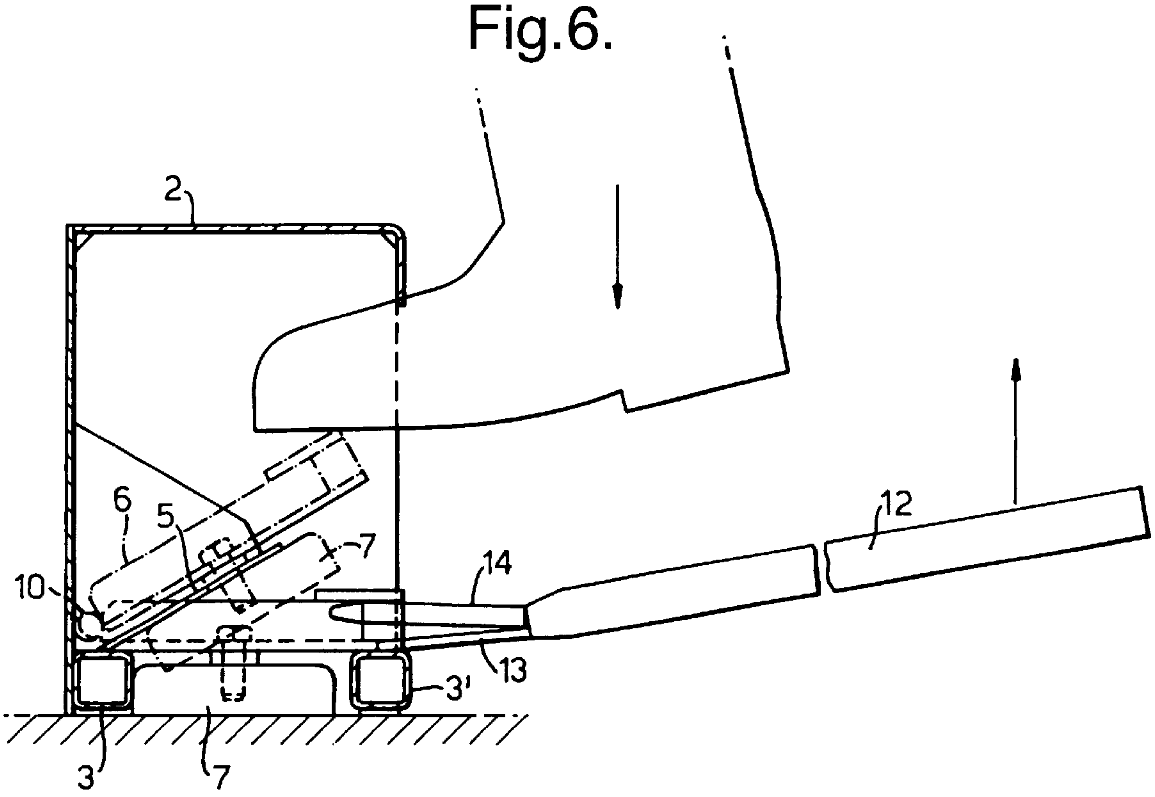
FIG. 6 shows how the system is used.

FIG. 6 shows how the system is used. The magnet is shown attached to the bed and detached from the bed by means of continuous and broken lines, respectively. The magnet is pushed onto the holder 5 through the open side of the side wall so that the ends of the pivoting shaft 10, which is parallel to the side wall, settle on the two branches of the holder 5. The upper counter surface of the magnet is fastened to the lower surface 5*a* of the holder 5 by the magnet force with the result that the magnet body is located above the holder. The magnet can be fastened to the side wall during the preliminary handling of the side wall so that the magnet ends up on the casting bed together with the side wall. Alternatively, it can be fastened after the equipment of the side, in other words the magnet is brought to the place where the side is equipped and pushed onto the holder there.

Once the side wall has been placed in the desired position on the casting bed, it is locked in place by pressing the magnet body 6 lightly with a foot at the back end of the side wall. The magnet 7 comes off the holder 5, the whole magnet part 15 pivots about the pivoting shaft 10, and the magnet fastens to the casting bed between the base pipes 3, 3' of the side wall. The ends of the magnet body 6 press the pipes 3, 3' downwards and press the side wall tightly against the bed. The magnet can also be used without the holder 5, i.e. it is placed directly on the base pipes 3, 3' of the side wall. In that case the magnet must always be removed from the side wall at the releasing stage.

The magnet is detached from the bed by turning the release lever. The outer, lower branches 13 of the lever are pushed between the base pipe 3 of the body 6 and the magnet, below the lower release surfaces 11'. The upper branch 14 in the middle is pushed into a cavity in the magnet body, below the upper release surface 11. After that the bar of the lever is turned upward. The effect of the lever is based on a two-stage removing process:

1) The process is initiated by detaching the magnet from the bed by means of a slight and very force-generating leverage ratio. The outer branches 13 are supported on the upper surface of the pipe 3', turning the magnet off about the base pipe 3, and push the release surfaces 11' upward. At the initial stage of the removal the longer branch 14 is not yet in contact with the release surface 11.

2) Once the outer branches first have detached the magnet, the magnet is turned up by means of a great and quick leverage ratio, the branch 14 in the middle continuing to lift the release surface 11 up with the result that the magnet fastens to the holder 5.

The magnet can be left attached to the side wall or it can be detached from the side wall. If the magnets for technological reasons do not have to be detached from side wall they can be left inside the side wall, fastened to the holder 5, so that they are already there when the side wall is positioned in place next time. The magnets stay in place in the side wall during lifting and storage. Thus, they neither interfere with the other sides nor change their adjustments. If desired, a magnet like this is easy to detach from the side by drawing it out by hand by holding it at the rear part of the magnet. The magnets can be detached already at an early stage of the casting bed cycle and used in the following castings.

The magnet is light and easy to handle and adjust. The whole adhering force of the magnet, 14 kN, for example, is optimized to keep the side wall against the bed. It supports and guides well even at the joints of the side walls.

What is claimed is:

1. A side wall system for a concrete casting mould, comprising:

a side part which is removably attachable to a casting bed by means of at least one magnet, a magnet part including said at least one magnet and a body that carries said at least one magnet, said body having a pivoting shaft such that the magnet part is pivotable about the pivoting shaft into a lower position wherein the magnet is fastened to the casting bed and into an upper position wherein the magnet is spaced from the casting bed, wherein the side part includes a holder for hanging the pivoting shaft of the magnet part such that the magnet part is pivotable between its lower and upper positions, and wherein the holder has a lower surface, an upper surface of the magnet being fastenable to the lower surface of the holder by means of a magnetic force when the magnet is pivoted into its upper position about the pivoting shaft.

2. A side wall system as defined in claim 1, wherein the holder in the side part has two branches with a gap between the branches, thereby allowing a portion of the body of the magnet part to pass therethrough when the magnet part is pivoted.

3. A side wall system as defined in claim 1, further comprising a release lever, wherein the body of the magnet part has at least two counter surfaces at different elevations, the at least two counter surfaces defining at least one lower counter surface and at least one upper counter surface, and wherein the release lever has at least two branches, least one of the at least two branches being positionable below the at least one lower counter surface, and another at least one of theat least two branches being positionable below the at least one upper counter surface so that the release lever can be turned about an axis parallel to the side wall.

4. A side wall system as defined in claim 3, wherein the at least one branch of the release lever that is positionable below the at least one lower counter surface of the body of the magnet part is shorter than the at least one branch that is positionable below the at least one upper counter surface of the body of the magnet part.

5. A side wall system as defined in claim 3, wherein the release lever has two branches that are positionable below the at least one lower counter surface of the body of the magnet part and between them a branch that is positionable below the at least one upper counter surface of the magnet part.

6. A side wall system as defined in claim 2, further comprising a release lever, wherein the body of the magnet part has at least two counter surfaces at different elevations, the at least two counter surfaces defining at least one lower counter surface and at least one upper counter surface, and wherein the release lever has at least two branches, at least one of the at least two branches being positionable below the at least one lower counter surface, and another at least one of the at least two branches being positionable below the at least one upper counter surface so that the release lever can be turned about an axis parallel to the side wall.

7. A side wall system as defined in claim 6, wherein the at least one branch of the release lever that is positionable below the at least one lower counter surface of the body of the magnet part is shorter than the at least one branch that is positionable below the at least one upper counter surface of the body of the magnet part.

8. A side wall system as defined in claim 4, wherein the release lever has two branches that are positionable below the at least one lower counter surface of the body of the magnet part and between them a branch that is positionable below the at least one upper counter surface of the magnet part.

9. A side wall system as defined in claim 7, wherein the release lever has two branches that are positionable below the at least one lower counter surface of the body of the magnet part and between them a branch that is positionable below the at least one upper counter surface of the magnet part.

* * * * *